United States Patent
Yu et al.

(10) Patent No.: US 8,545,107 B2
(45) Date of Patent: Oct. 1, 2013

(54) OPTICAL FIBER CONNECTOR

(75) Inventors: Tai-Cherng Yu, New Taipei (TW);
Kun-Chan Wu, New Taipei (TW);
Chia-Ling Hsu, New Taipei (TW);
I-Thun Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 311 days.

(21) Appl. No.: 13/028,162

(22) Filed: Feb. 15, 2011

(65) Prior Publication Data
US 2012/0148200 A1 Jun. 14, 2012

(30) Foreign Application Priority Data
Dec. 14, 2010 (TW) .............................. 99143587 A

(51) Int. Cl.
*G02B 6/36* (2006.01)
(52) U.S. Cl.
USPC .......................................................... 385/53
(58) Field of Classification Search
None
See application file for complete search history.

(56) References Cited

U.S. PATENT DOCUMENTS

| 4,088,386 A * | 5/1978 | Hawk ............................... 385/59 |
| 4,155,624 A * | 5/1979 | Logan et al. ..................... 385/65 |
| 4,830,456 A * | 5/1989 | Kakii et al. ...................... 385/75 |
| 5,611,017 A * | 3/1997 | Lee et al. ........................ 385/114 |
| 6,742,937 B2 * | 6/2004 | Lee et al. ......................... 385/78 |
| 6,817,777 B1 * | 11/2004 | Grabbe ............................ 385/59 |
| 2012/0070118 A1 * | 3/2012 | Ko ................................... 385/33 |

* cited by examiner

*Primary Examiner* — Sung Pak
(74) *Attorney, Agent, or Firm* — Altis & Wispro Law Group, Inc.

(57) ABSTRACT

An optical fiber connector includes a number of optical fibers, a body, a number of supports and a cover. The body includes a number of lens portions at a first end thereof, a number of through holes at an opposite second end, and a recess located between the lens portions and the through holes. The through holes are in communication with the recess. The optical fibers extend through the respective through holes and terminate at the respective lens portions. The supports are formed in the recess. Each support supports and retains a portion of the corresponding optical fiber exposed in the recess. The cover is received in the recess. The cover has a number of slanted faces spatially corresponding to the respective supports. The slanted faces and the supports cooperatively securely sandwich the exposed portions of the optical fibers in the body.

18 Claims, 6 Drawing Sheets

OPTICAL FIBER CONNECTOR

BACKGROUND

1. Technical Field

The present disclosure relates to optical fiber connectors.

2. Description of Related Art

Optical fiber connectors typically include a lens and a blind hole behind the lens. The blind hole receives an optical fiber. The lens receives and guides light from the optical fiber.

Injection molding is a popular method of fabricating optical fiber connectors. A mold used includes a core pin to form the blind hole. During injection molding, however, the core pin may be bent by impact of introduced molding material, thus producing a blind hole out of spec.

Therefore, an optical fiber connector which can overcome the limitations described, is needed.

DETAILED DESCRIPTION

Figure 1:
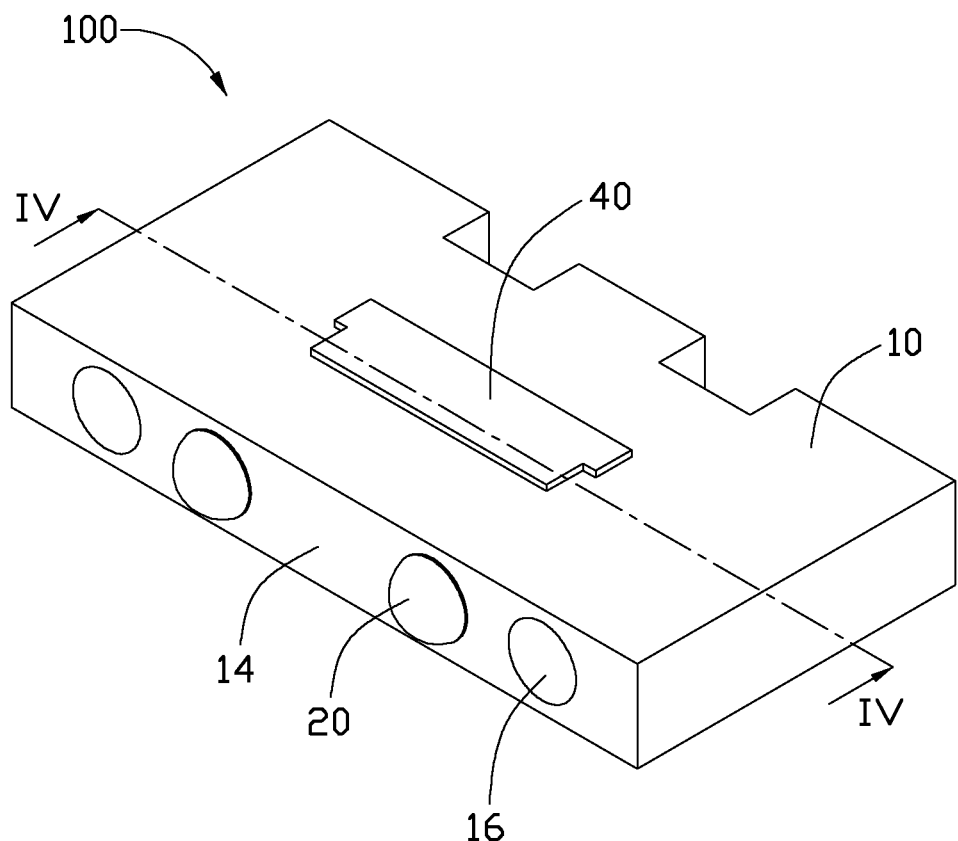
FIG. 1 is a schematic view of an optical fiber connector, according to a first embodiment.
Figure 2:
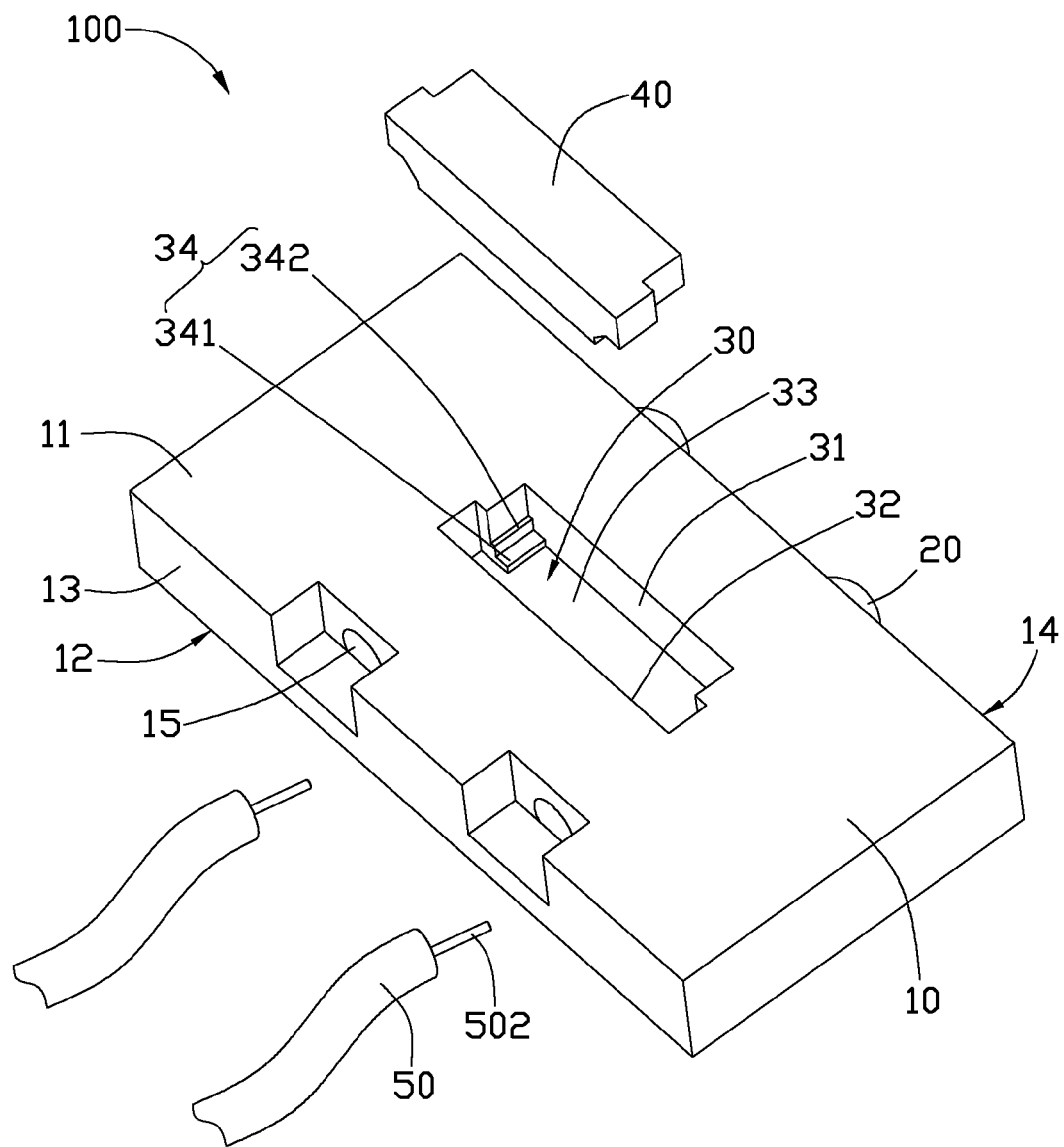
FIG. 2 is an exploded view of the optical fiber connector of FIG. 1, viewed from another angle.
Figure 3:
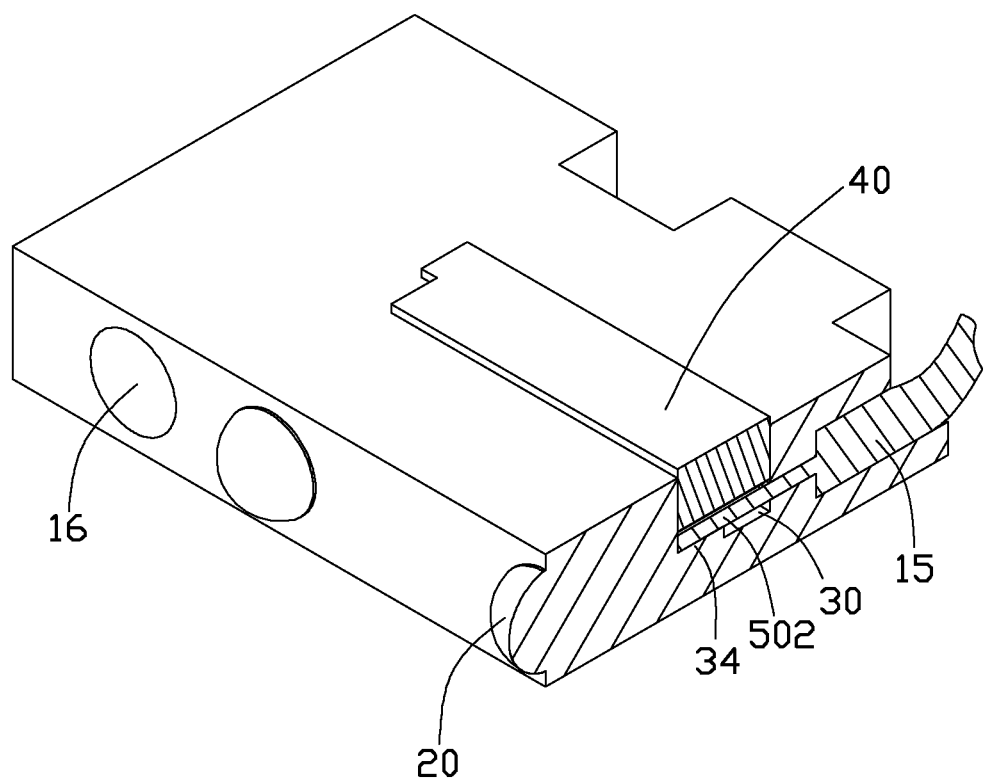
FIG. 3 is a cutaway view of the optical fiber connector of FIG. 2.
Figure 4:
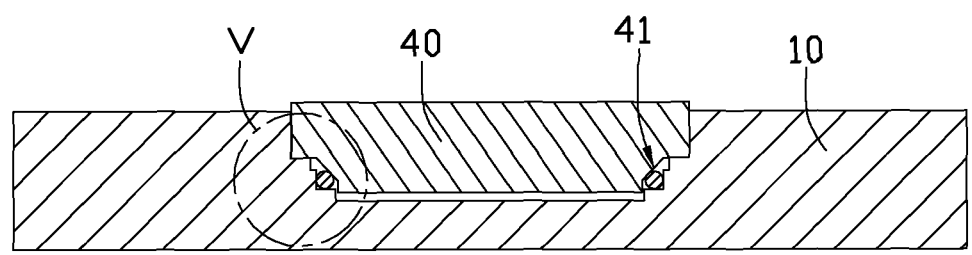
FIG. 4 is a sectional view of the optical fiber connector taken along the line IV-IV of FIG. 2.
Figure 5:
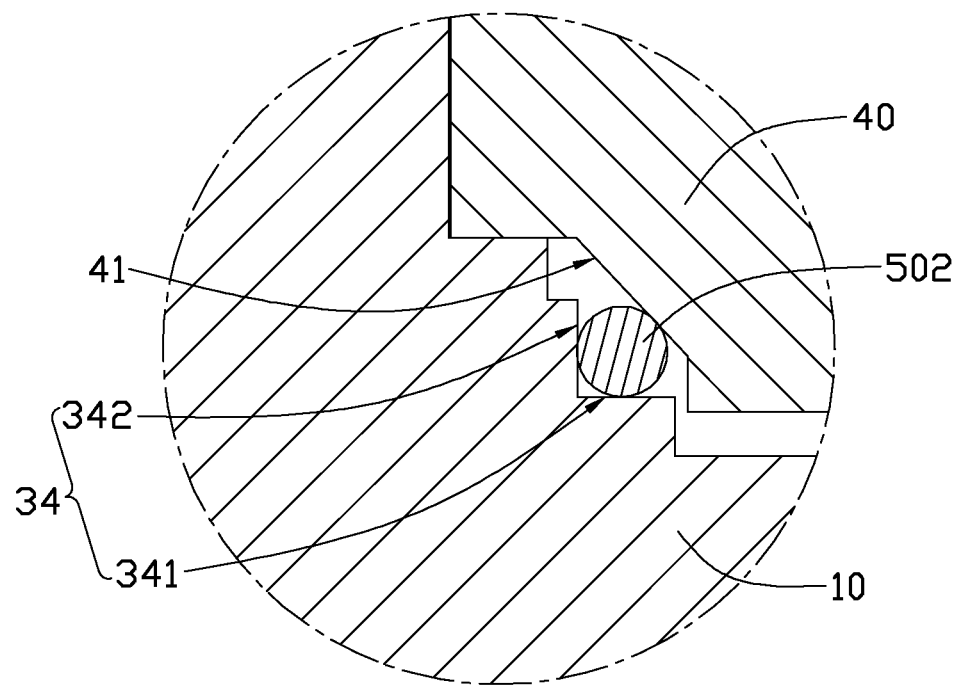
FIG. 5 is an enlarged view of circled portion V of FIG. 3.

Referring to FIGS. 1 to 5, an optical fiber connector 100, according to a first embodiment, includes a body 10, a cover 40, and two optical fibers 50.

The body 10 is substantially cuboid and includes a first end 14, an opposite second end 13, a first side surface 11, and a second side surface 12 opposite to the first side surface 11. The first side surface 11 and the second side surface 12 connect the first end 14 to the second end 13. Two lens portions 20 are formed at the first end 14. Two insertion holes 16 are defined at the first end 14. The two lens portions 20 are located between the two insertion holes 16. The insertion holes 16 are configured for positioning the body 10 when the optical fiber connector 10 is coupled to another optical fiber connector. The body 10 may be formed by injection molding.

The body 10 defines two through holes 15 and a recess 30. The through holes 15 are defined at the second end 13 and respectively receive the optical fibers 50. Each of the optical fibers 50 has a distal portion 502 exposed in the recess 30. The two through holes 15 are parallel to each other and are aligned with the lens portions 20 respectively. The through holes 15 extend from the second end 13 to the first end 14 and are in communication with the recess 30. The recess 30 is located between the lens portions 20 and the through holes 15. The optical fibers 50 extend through the respective through holes 15 and terminate at the respective lens portions 20. The body 10 includes a first inner surface 31, a second inner surface 32 and a bottom surface 33 in the recess 30. The first inner surface 31 is opposite to the second inner surface 32. The bottom surface 33 connects the first inner surface 31 to the second inner surface 32. The through holes 15 extend through the second inner surface 32. In this embodiment, the first inner surface 31 coincides with a focal plane of the lens portion 20. It is to be understood that in alternative embodiments, the first inner surface 31 may be positioned on a plane parallel to the focal plane of the lens portion 20.

Two L-shaped supports 34 are formed in the recess 30 and extend from the bottom surface 33. Each support 34 supports and retains the portion 502 of the corresponding optical fiber 50 exposed in the recess 30. The support 34 connects the first inner surface 31 to the bottom surface 33. Specifically, each support 34 includes a horizontal surface 341 and a vertical surface 342 connecting perpendicular to the horizontal surface 341. The horizontal surface 341 is substantially parallel to the bottom surface 33. The vertical surface 342 is substantially perpendicular to the bottom surface 33. The exposed portions 502 of the optical fibers 50 are supported on the corresponding supports 34. Ends of the optical fibers 50 distal from the second inner surface 32 are in contact with the first inner surface 31.

The cover 40 is shaped to be received in the recess 30 and may be secured in the recess 30 by adhesive. Material of the cover 40 may be transparent to ultraviolet light so that the adhesive can be cured thereby. The cover 40 is received substantially perpendicular to a longitudinal axis of the through hole 15.

The cover 40 includes two slanted faces 41 arranged at opposite ends of the cover 40. Each of the slanted faces 41 is obliquely oriented relative to the corresponding the vertical surface 342 and the horizontal surface 341. The slanted faces 41 respectively abut the exposed portions 502 of the corresponding optical fibers 50 so that the supports 34 and the cover 40 cooperatively securely sandwich the exposed portions 502 of the optical fibers 50 in the body 10. Cooperation of the supports 34 and the slanted faces 41 can function as blind holes and the blind holes for receiving the optical fibers 50 are omitted, making it is easier to mold the body 10 to desired tolerances with the supports 34 and the cover 40 with slanted faces 41 than to mold a body with blind holes to desired tolerances.

Figure 6:
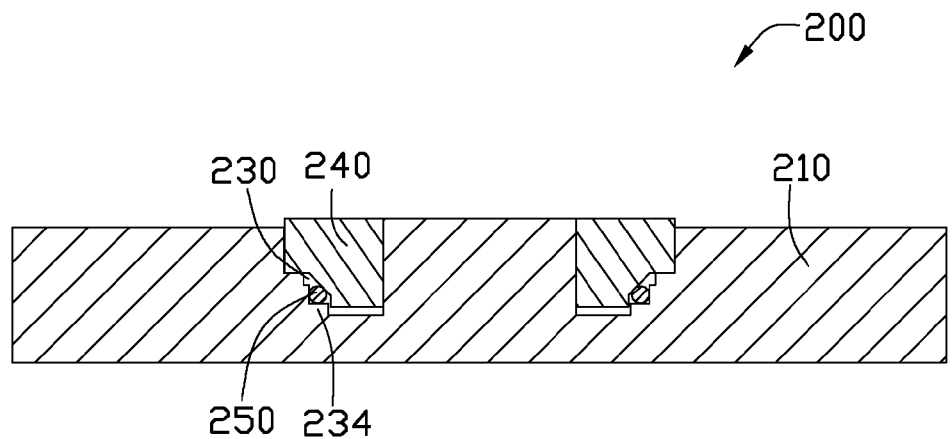
FIG. 6 is a sectional view of an optical fiber connector according to a second embodiment.

Referring to FIG. 6, an optical fiber connector 200, according to a second embodiment, is shown, differing from optical fiber connector 100 of the first embodiment only in that the optical fiber connector 200 includes two covers 240 and a body 210 of the optical fiber connector 200 defines two recesses 230.

Each of the covers 240 is shaped to be received in a corresponding recess 230. A support 234 is formed in each recess 230. The supports 234 and the covers 240 cooperatively securely sandwich portions 250 of the optical fibers exposed in the respective recesses 230.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An optical fiber connector, comprising:
   a plurality of optical fibers;
   a body comprising a plurality of lens portions at a first end thereof, a plurality of through holes at an opposite second end, and a recess located between the lens portions and the through holes, the recess comprising an inner surface separated from the first end, the through holes being in communication with the recess, the optical fibers extending through the respective through holes and terminating at the inner surface;

a plurality of supports formed in the recess, each support supporting and retaining a portion of the corresponding optical fiber exposed in the recess; and a cover received in the recess, the cover having a plurality of slanted faces spatially corresponding to the respective supports, the slanted faces and the supports cooperatively securely sandwiching the exposed portions of the optical fibers in the body.

2. The optical fiber connector of claim 1, wherein the through holes are parallel, and an insertion direction of the cover is substantially perpendicular to a longitudinal axis of the through hole.

3. The optical fiber connector of claim 1, wherein the body comprises a bottom surface in the recess, the supports protruding from the bottom surface.

4. The optical fiber connector of claim 3, wherein each support includes a horizontal surface and a vertical surface, the horizontal surface substantially parallel to the bottom surface, the vertical surface substantially perpendicular to the bottom surface, each slanted face obliquely oriented relative to the corresponding horizontal surface and the vertical surface.

5. The optical fiber connector of claim 4, wherein the slated faces are arranged at opposite ends of the cover.

6. An optical fiber connector, comprising:

a plurality of optical fibers;

a body comprising a plurality of lens portions at a first end thereof, a plurality of through holes at an opposite second end, and a plurality of recesses located between the lens portions and the through holes, each of the recesses comprising an inner surface separated from the first end, the optical fibers extending through the respective through holes and terminating at the respective inner surface, each of the optical fibers having a portion exposed in the corresponding recess;

a plurality of supports formed in the corresponding recesses, each of the supports supporting the exposed portion of the corresponding optical fiber; and a plurality of covers each received in the corresponding recess, each cover having a slanted face corresponding to the corresponding support, the slated faces and the supports cooperatively sandwiching the exposed portions of the respective optical fibers in the body.

7. The optical fiber connector of claim 6, wherein the through holes are parallel, and insertion directions of the covers are substantially perpendicular to a longitudinal axis of the through hole.

8. The optical fiber connector of claim 6, wherein the body comprises a plurality of bottom surfaces in the respective recesses, the supports protruding from the respective bottom surfaces.

9. The optical fiber connector of claim 6, wherein each support includes a horizontal surface and a vertical surface, the horizontal surface substantially parallel to the bottom surface, the vertical surface substantially perpendicular to the bottom surface, each slanted face obliquely oriented relative to the corresponding horizontal surface and the vertical surface.

10. The optical fiber connector of claim 1, wherein the inner surface coincides with a focal plane of the lens portions.

11. The optical fiber connector of claim 10, wherein the through holes are parallel to each other, and an insertion direction of the cover is substantially perpendicular to a longitudinal axis of the through holes.

12. The optical fiber connector of claim 10, wherein the body comprises a bottom surface in the recess, and the supports protrude from the bottom surface.

13. The optical fiber connector of claim 12, wherein each support comprises a horizontal surface and a vertical surface, the horizontal surface substantially parallel to the bottom surface, the vertical surface substantially perpendicular to the bottom surface, each slanted face obliquely oriented relative to the corresponding horizontal surface and the corresponding vertical surface.

14. The optical fiber connector of claim 13, wherein the slated faces are arranged at two opposite ends of the cover.

15. The optical fiber connector of claim 6, wherein the inner surface coincides with a focal plane of the lens portions.

16. The optical fiber connector of claim 15, wherein the through holes are parallel to each other, and insertion directions of the covers are substantially perpendicular to a longitudinal axis of the through holes.

17. The optical fiber connector of claim 15, wherein the body comprises a plurality of bottom surfaces in the respective recesses, and the supports protrude from the respective bottom surfaces.

18. The optical fiber connector of claim 17, wherein each support comprises a horizontal surface and a vertical surface, the horizontal surface substantially parallel to the bottom surfaces, the vertical surface substantially perpendicular to the bottom surfaces, each slanted face obliquely oriented relative to the corresponding horizontal surface and the corresponding vertical surface.

* * * * *